United States Patent [19]

Tezuka et al.

[11] Patent Number: 4,629,250
[45] Date of Patent: Dec. 16, 1986

[54] RECLINING ANGLE ADJUSTMENT DEVICE

[75] Inventors: Takeshi Tezuka; Akira Owada; Naoaki Katsumoto, all of Kanagawa, Japan

[73] Assignee: Shiroki Kinzoku Kogyo Kabushiki Kaisha, Fujisawa, Japan

[21] Appl. No.: 728,393

[22] Filed: Apr. 29, 1985

[30] Foreign Application Priority Data

May 9, 1984 [JP] Japan .............................. 59-68196[U]

[51] Int. Cl.$^4$ ................................................ B60N 1/02
[52] U.S. Cl. .................................... 297/362; 297/367; 297/379
[58] Field of Search ............... 297/361, 362, 366, 367, 297/368, 369, 354, 355, 379

[56] References Cited

U.S. PATENT DOCUMENTS

| | | | |
|---|---|---|---|
| 4,085,969 | 4/1978 | Nakane et al. | 297/367 |
| 4,382,630 | 5/1983 | Weston | 297/362 |
| 4,457,556 | 7/1984 | Klingelhofer | 297/362 |
| 4,457,557 | 7/1984 | Une | 297/367 X |

FOREIGN PATENT DOCUMENTS

| | | | |
|---|---|---|---|
| 1904688 | 9/1970 | Fed. Rep. of Germany | 297/355 |
| 2059496 | 4/1981 | United Kingdom | 297/362 |

Primary Examiner—William E. Lyddane
Assistant Examiner—Mark W. Binder
Attorney, Agent, or Firm—Finnegan, Henderson, Farabow, Garrett & Dunner

[57] ABSTRACT

A reclining angle adjustment device for use with a reclining seat includes an intermediate gear plate having an outer gear, a first arm having an inner gear meshing with the outer gear, an angularly movable shaft having concentric and eccentric portions on which the intermediate gear plate and the first arm are angularly movably mounted, respectively, a second arm supporting the angularly movable shaft thereon, a release lever for unlocking the intermediate gear plate from the second arm for rough adjustment of a reclining angle, a control handle for turning the angularly movable shaft for fine adjustment of the reclining angle, a pin secured to the second arm by a pin bracket and having a groove, a spiral spring having an inner and engaging in the groove for imposing a turning force produced at an outer end thereof on the intermediate gear plate, and a hook plate angularly movably mounted on the pin for transmitting the turning force of the spiral spring to the intermediate gear plate through the hook plate, whereby the position in which the turning force is transmitted to the intermediate gear plate is located closely to the plane in which the intermediate gear plate is angularly movable.

5 Claims, 8 Drawing Figures

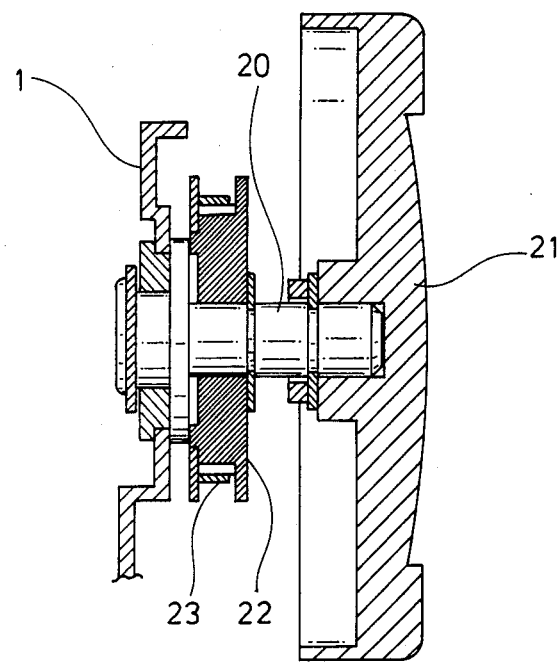
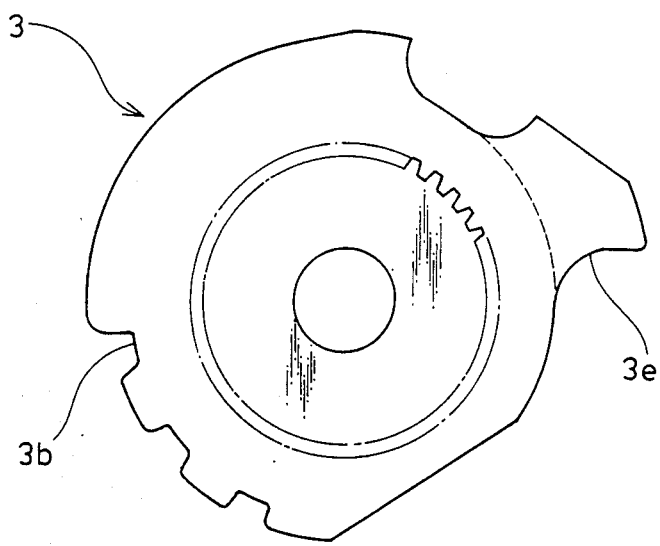

4,629,250

RECLINING ANGLE ADJUSTMENT DEVICE

BACKGROUND OF THE INVENTION

The present invention relates to a reclining angle adjustment device for adjusting the angle of inclination of the seat back of a reclining seat, i.e., the reclining angle of the reclining seat.

Japanese Patent Publication No. 57-11207 discloses a reclining angle adjustment device having a pawl and a rack engageable and disengageable for roughly adjusting the reclining angle of a reclining seat, and a planetary gear mechanism for fine adjustment of the reclining angle. Another reclining angle adjustment device disclosed in Japanese Laid-Open Utility Model Publication No. 56-80739 includes a balancing spiral spring added to the device shown in the aforesaid reclining angle adjustment device.

The latter reclining angle adjustment device comprises an intermediate gear plate having an outer gear, an upper arm having an inner gear meshing with the outer gear of the intermediate gear plate, an angularly movable shaft on which the intermediate gear plate and the upper arm are angularly movably mounted respectively at concentric and eccentric portions of the shaft, a lower shaft supporting the angularly movable shaft, a release lever for unlocking the intermediate gear plate from the lower arm for rough adjustment of the reclining angle, a control handle for turning the angularly movable shaft for fine adjustment of the reclining angle, a grooved pin fixed to the lower arm through a pin bracket, and a spiral spring having an inner end engaging in the groove of the pin for imposing a turning force produced at the outer end thereof on the intermediate gear plate.

The spiral spring and the intermediate gear plate are coaxially disposed, but are substantially spaced axially from each other. In order to transmit the turning force produced at the outer end of the spiral spring to the intermediate gear plate, the intermediate gear plate has a projecting outer edge portion with its distal end bent toward the outer end of the spiral spring, the outer end of which engages the bent distal end of the intermediate gear plate. Therefore, the point where the outer end of the spiral spring engages the bent distal end of the intermediate gear plate, i.e., the point where the motion is transmitted to the intermediate gear plate, and the plane in which the intermediate gear plate is turned, are spaced from each other by a large distance (hereinafter referred to as an "offset"). When the intermediate gear plate is tilted with respect to the angularly movable shaft, a large torque is produced to generate large frictional forces between the angularly movable shaft and other surrounding components such as the intermediate gear plate. Therefore, the conventional reclining angle adjustment device has been disadvantageous in that a large force is required to turn the angularly movable shaft, i.e., the force required to operate the control handle should be large.

SUMMARY OF THE INVENTION

It is an object of the present invention to provide a reclining angle adjustment device in which the force required to operate a control handle is relatively small.

Another object of the present invention is to provide a reclining angle adjustment device having a relatively simple structure for allowing a control handle to be operated with a relatively small force.

According to the present invention, there is provided a reclining angle adjustment device comprising an intermediate gear plate having an outer gear, a first arm having an inner gear meshing with the outer gear, an angularly movable shaft having concentric and eccentric portions on which the intermediate gear plate and the first arm are angularly movably mounted, respectively, a second arm supporting the angularly movable shaft thereon, a release lever for unlocking the intermediate gear plate from the second arm for rough adjustment of a reclining angle, a control handle for turning the angularly movable shaft for fine adjustment of the reclining angle, a pin secured to the second arm by a pin bracket and having a groove, a spiral spring having an inner end engaged in the groove for imposing a turning force produced at an outer end thereof on the intermediate gear plate, and a hook plate angularly movably mounted on the pin for transmitting the turning force of the spiral spring to the intermediate gear plate through the hook plate, whereby the position in which the turning force is transmitted to the intermediate gear plate is located closely to the plane in which the intermediate gear plate is angularly movable.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4 is a cross-sectional view taken along line IV—IV of FIG. 1;

FIG. 6 is a plan view of an intermediate gear plate of the reclining angle adjustment device.

DESCRIPTION OF THE PREFERRED EMBODIMENT

Figure 1:
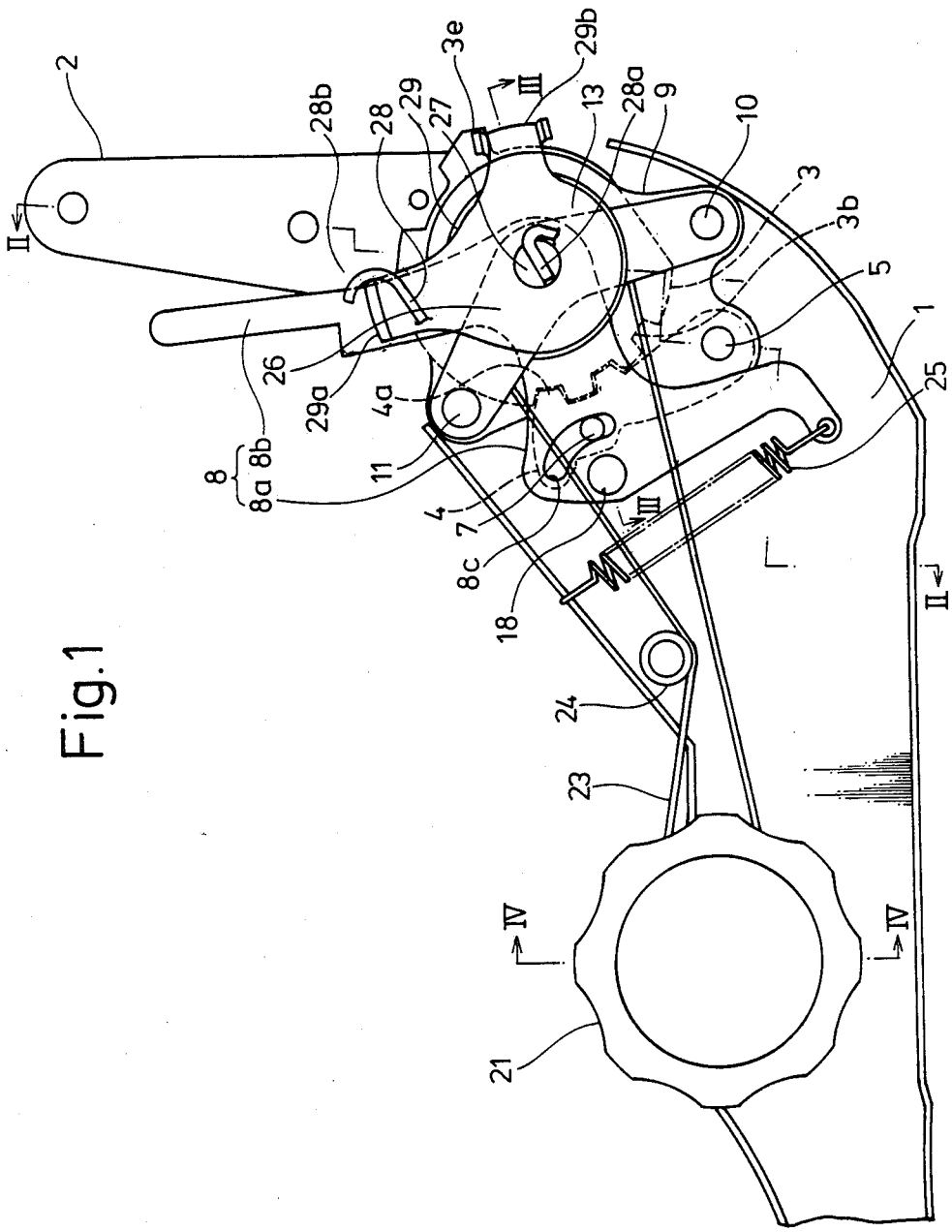
FIG. 1 is a side elevational view of a reclining angle adjustment device according to the present invention.
Figure 2:
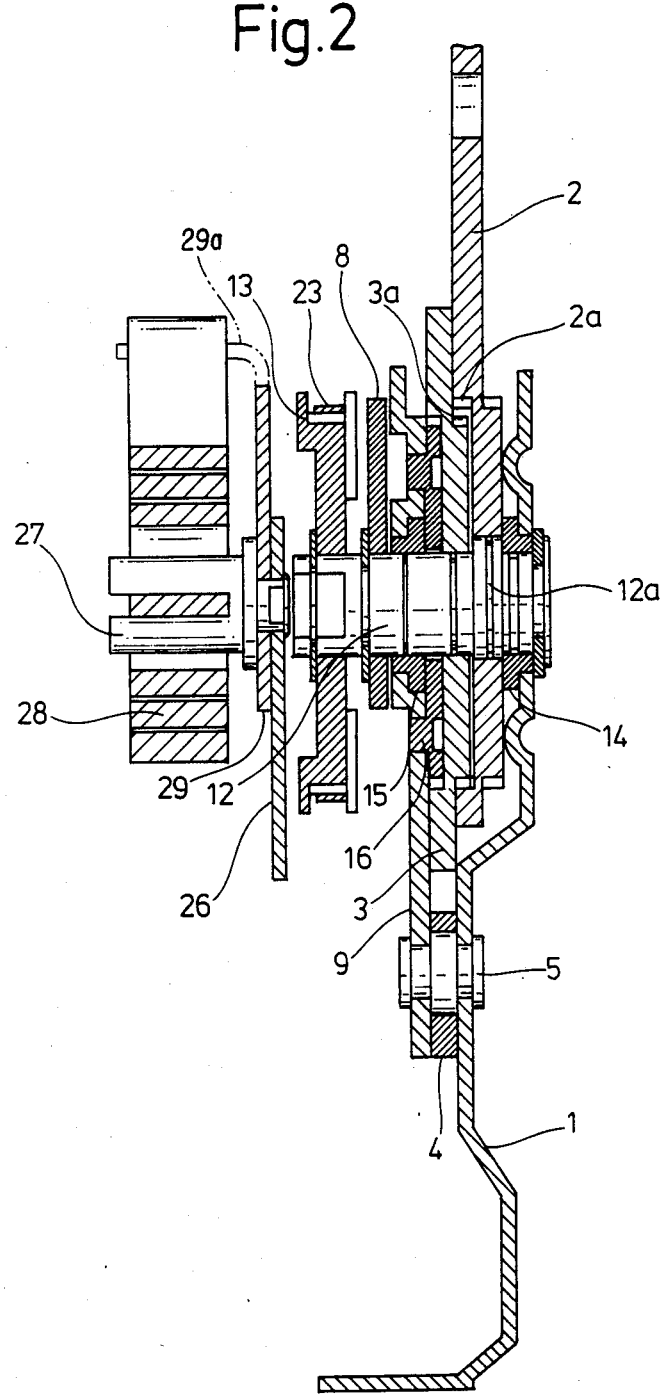
FIG. 2 is a cross-sectional view taken along line II—II of FIG. 1.

As shown in FIGS. 1 through 4, a reclining angle adjustment device includes a lower arm 1 fixed as by screws to the seat cushion (not shown) of a reclining seat, and an upper arm 2 fixed as by screws to the seat back (not shown) of the reclining seat. The upper arm 2 has an inner gear 2a embossed on a side thereof as by precision pressing. An intermediate gear plate 3 is disposed adjacent to the upper arm 2 and has an outer gear 3a embossed as by precision pressing on a side thereof facing the inner gear 2a of the upper arm 2. The intermediate gear plate 3 also has a rack 3b on an outer edge thereof. The number of teeth of the inner gear 2a is selected to be at least one larger than the number of teeth of the outer gear 3a.

A pawl 4 is pivotally mounted on the lower arm 1 by a stepped pin 5 and has locking teeth 4a for engaging the rack 3b of the intermediate gear plate 3. A pin 7 is mounted on the pawl 4 near the locking teeth 4a and projects in a direction opposite to the lower arm 1, the pin 7 being inserted in a cam slot 8c defined in a noncontrol portion 8a of a release lever 8. A subplate 9 is positioned more closely than the release lever 8 to the lower arm 1. The subplate 9 has attachment holes corresponding in position to the stepped pin 5 and stepped pins 10, 11, and is secured through the attachment holes to the lower arm 1 to prevent the upper arm 2, the intermediate gear plate 3, and the pawl 4 from being disassembled. An angularly movable shaft 12 includes an eccentric portion 12a disposed partially on a concentric portion thereof.

For assembly, the concentric portion of the angularly movable shaft 12 is angularly movably inserted through a bushing 14 of the lower arm 1, a central hole defined in the intermediate gear plate 3 in concentric relation to the outer gear 3a, a bushing 15 of the subplate 9, a spacer 16 attached to the subplate 9, and a hole defined in the release lever 8. The eccentric portion 12a of the angularly movable shaft 12 is angularly movably inserted through a hole defined in the upper arm 2 in concentric relation to the inner gear 2a. A pulley 13 is mounted on one end of the concentric portion of the angularly movable shaft 12 for angular movement therewith. Thus, the upper arm 2 and the intermediate gear plate 3 are angularly movably mounted respectively on the eccentric portion 12a and the concentric portion of the angularly movable shaft 12, and the inner gear 2a and the outer gear 3a are held in mesh with each other, thereby providing a planetary gear mechanism. The spacer 16 is inserted in a recess defined in the intermediate gear plate 3 remotely from the outer gear 3a, and has an outer peripheral surface supporting the intermediate gear plate 3. A stepped pin 18 is mounted on an intermediate portion of the noncontrol portion 8a of the release arm 8. A roller 19 fitted over the stepped pin 18 is held against the back of the pawl 4 for keeping the locking teeth 4a of the pawl 4 in reliable engagement with the rack 3b of the intermediate gear plate 3.

A handle shaft 20 is angularly movably mounted on the lower arm 1. A control handle 21 is attached to one end of the handle shaft 20. A pulley 22 is mounted on an intermediate portion of the handle shaft 20 for turning movement therewith. A belt 23 is trained around the pulley 22 and the pulley 13 and includes an intermediate portion pressed by a guide roller 24 mounted on the lower arm 1. The pulleys 13, 22 and the belt 23 have grooves for preventing slippage therebetween.

A spring 25 acts between the release lever 8 and the lower arm 1 for normally urging the pawl 4 to turn in a direction to mesh with the intermediate plate 3. A pin bracket 26 is secured by the stepped pins 10, 11 to the lower arm 1 and has an intermediate portion coaxial with the angularly movable shaft 12 and to which a grooved pin 27 is fixed.

Figure 3:
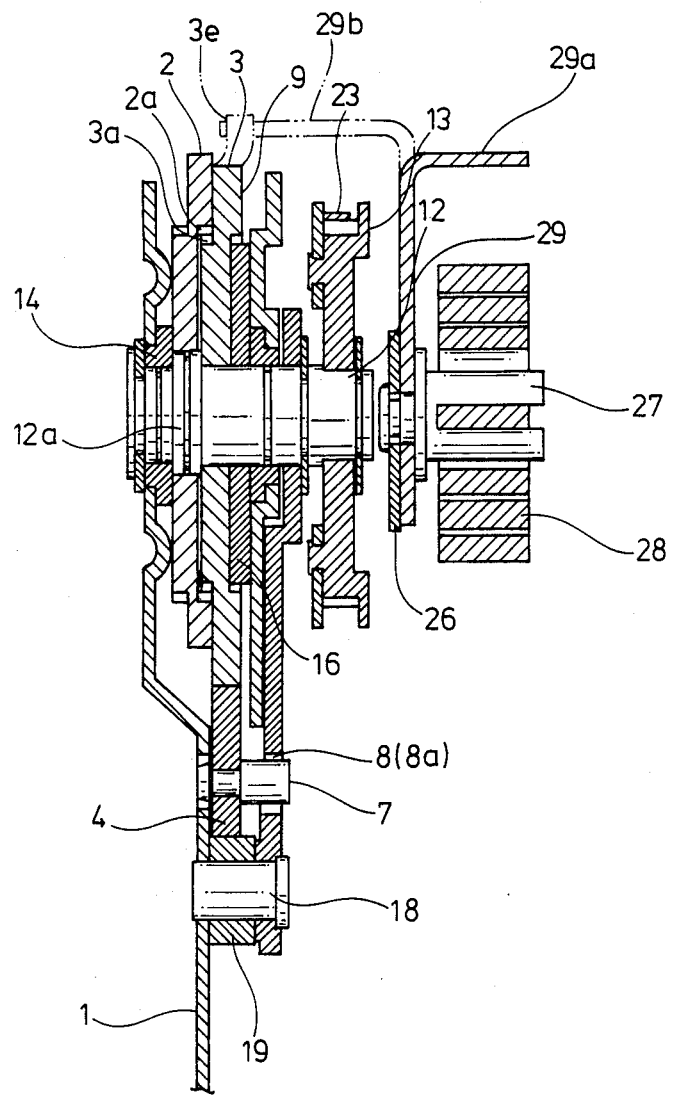
FIG. 3 is a cross-sectional view taken along line III—III of FIG. 1.
Figure 5A:
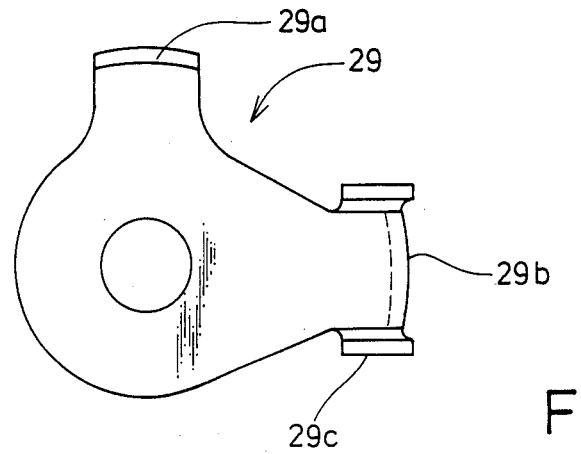
FIG. 5(a) is a front elevational view of a hook plate of the reclining angle adjustment device.
Figure 5B:
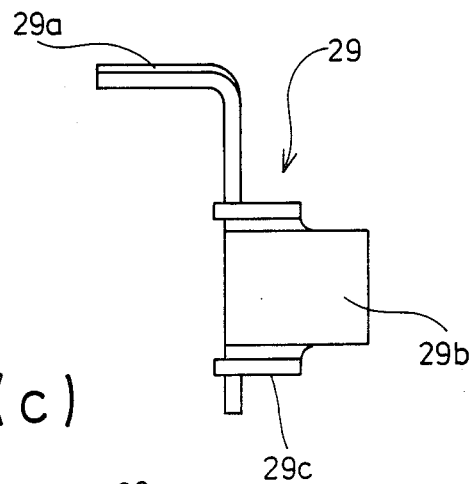
FIG. 5(b) is a side elevational view of the hook plate.
Figure 5C:
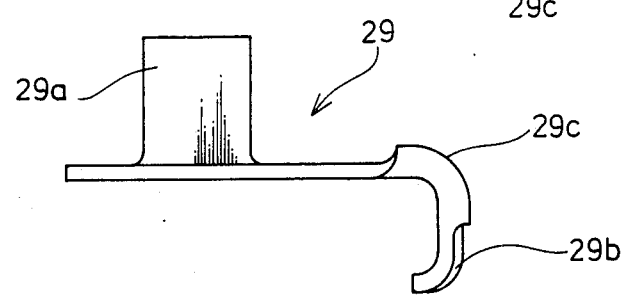
FIG. 5(c) is a plan view of the hook plate.

A spiral spring 28 has an inner end 28a disposed in the groove of the pin 27. A hook plate 29 is angularly movably mounted on the grooved pin 27. As shown in FIGS. 5(a) through 5(c), the hook plate 29 has a first hook 29a bent toward the intermediate gear plate 3 and a second hook 29b bent toward the spiral spring 28. The spiral spring 28 has an outer end 28b held in engagement with the first hook 29a of the hook plate 29, the second hook 29b thereof engaging a hook 3e of the intermediate gear plate 3. As illustrated in FIGS. 3 and 6, the hook 3e of the intermediate gear plate 3 is stepped with respect to the remainder of the gear plate 3 so as to be displaced slightly toward the spiral spring 28 from the plane in which the intermediate gear plate 3 is angularly movable. Since the hook 3e is stepped only for the purpose of increasing the mechanical strength thereof, the hook 3e may not necessarily be stepped. The hook plate 29 has flanges 29c adjacent to the hook 29b for reinforncing the same. Since the flanges 29c are provided only for reinforcing the hook 29b, the flanges 29c may also be dispensed with.

Operation of the reclining angle adjustment device is as follows: In the position shown in FIG. 1, the locking teeth 4a of the pawl 4 mesh with the rack 3b of the intermediate gear plate 3 to lock the gear plate 3. Therefore, the outer gear 3a is fixed with respect to the lower arm 1. By turning the control handle 21, the angularly movable shaft 12 is turned through the belt 23 to cause the upper arm 2 to turn at a prescribed speed-reduction ratio through the planetary gear mechanism for fine adjustment of the reclining angle. For rough adjustment of the reclining angle, a control portion 8b of the release lever 8 is turned counterclockwise in FIG. 1 by the passenger on the reclining seat. The roller 19 is also turned counterclockwise in a direction to disengage from the pawl 4. (The lower arm 1 has arcuate holes defined therein to allow the pins 7, 18 to move therein for permitting the roller 19 to turn as described above.) The pin 7 in the cam slot 8c now moves toward the control handle 21. The locking teeth 4a are then brought out of mesh with the rack 3b of the intermediate gear plate 3, which is now unlocked. The intermediate gear plate 3 and the upper arm 2 are turned counterclockwise in FIG. 1 under the force of the spiral spring 28. The passenger on the reclining seat then pushes the seat back with his back until the seat back is tilted at a desired reclining angle. The release lever 8 is then released by the passenger whereupon the reclining angle has now been roughly adjusted at angular intervals of meshing engagement between the intermediate gear plate 3 and the pawl 4.

The turning force of the spiral spring 28 is transmitted to the hook 3e of the intermediate gear plate 3 through the outer end 28b of the spiral spring 28, the first hook 29a of the hook plate 29, and the second hook 29b thereof. Therefore, the position in which the turning force is transmitted from the spiral spring 28 to the intermediate gear plate 3 is the same as the point where the second hook 29b of the hook plate 29 engages the hook 3e of the intermediate gear plate 3. In the illustrated embodiment, accordingly, the distance between the last-mentioned point and the plane in which the intermediate gear plate 3 is angularly movable is equal to the offset as defined above. The offset is considerably small, and any frictional forces produced between the angularly movable shaft 12 and the surrounding components such as the intermediate gear plate 3 are small, thus allowing the control handle 21 to be operated with a reduced force.

With the arrangement of the present invention, as described above, since the turning force of the spiral spring is transmitted through the hook plate to the intermediate gear plate, the offset is small, and hence the force required to turn the control handle is reduced through the simple structure.

Although a certain preferred embodiment has been shown and described, it should be understood that many changes and modifications may be made therein without departing from the scope of the appended claims. For example, while the hook plate 29 is shown as being composed of a single plate, it may be constructed of a plurality of components. As an example, the hook 29a may be composed of a separate member, which may be secured to the hook plate 29 proper. The lower arm 1 and the upper arm 2 may be switched around so that the arm 1 is fixed to the seat back and the arm 2 is fixed to the seat cushion. Two reclining angle adjustment devices of the aforesaid construction, one being the mirror image of the other, may be disposed on the lateral sides of a reclining seat, and interlinked by a known linking mechanism, thereby providing a double-sided reclining angle adjustment device which can be operated with ease.

What is claimed is:
1. A reclining angle adjustment device comprising:
    (a) an intermediate gear plate having an outer gear;
    (b) a first arm;
    (c) an angularly movable shaft having concentric and eccentric portions on which said intermediate gear plate and said first arm are angularly movably mounted, respectively;
    (d) a second arm mounted on said angularly movable shaft and having an inner gear meshing with said outer gear of said intermediate gear plate;
    (e) a release lever for unlocking said intermediate gear plate from said second arm for rough adjustment of a reclining angle;
    (f) a control handle for turning said angularly movable shaft for fine adjustment of the reclining angle;
    (g) a pin having a groove and being secured to said second arm by a pin bracket;
    (h) a spiral spring having an inner end engaged in said groove, said spring producing at an outer end thereof a turning force for transmission to said intermediate gear plate; and
    (i) a hook plate angularly movably mounted on said pin for transmitting said turning force of said spiral spring to said intermediate gear plate through the hook plate, said hook plate engaging said outer end of said spring and said intermediate gear plate, whereby the position at which the turning force is transmitted to said intermediate gear plate is located close to the plane in which said intermediate gear plate is angularly movable.

2. A reclining angle adjustment device according to claim 1, wherein said pin is positioned coaxially with said angularly movable shaft.

3. A reclining angle adjustment device according to claim 1, wherein said hook plate is positioned between said intermediate gear plate and said spiral spring, said hook plate having a first hook bent toward said spiral spring and engaging the outer end of said spiral spring and a second hook bent toward said intermediate gear plate and engaging a hook thereof.

4. A reclining angle adjustment device according to claim 3, wherein said hook plate has flanges for reinforcing said second hook.

5. A reclining angle adjustment device according to claim 3, wherein said hook of said intermediate gear plate is stepped so as to be reinforced.

* * * * *